Patented Apr. 15, 1952

2,593,352

UNITED STATES PATENT OFFICE 2,593,352

PRODUCTION OF ZIRCONIUM SILICATE REFRACTORY

Clifford Shaw, William Edwin Smith, and Denis Eric Bosworth Greensmith, London, England; said Greensmith assignor to said Shaw and said Smith No Drawing. Application July 23, 1946, Serial No. 685,766. In Great Britain August 23, 1945

6 Claims. (Cl. 106—57)

This invention relates to refractory materials for furnace linings, crucibles, casting moulds, combustion tubing and many other articles required to stand high temperatures without softening or disintegrating.

In British patent specification No. 575,734 a method of making a mould or core for metal casting is described and claimed according to which a refractory aggregate, such as moulders' sand, is damped with a binder liquid comprising a hardenable organic silicon compound and shaped round a pattern without setting the binder. The binder is subsequently set and the pattern removed and the mould then heated to harden the binder. If desired the heating can be continued to 700° C.–1,000° C. to convert the binder into anhydrous silica.

The present invention is based on the discovery that if a heat hardenable organic silicon compound be mixed with zirconia in such proportions that the mixtures of oxides obtained when the organic constituent is decomposed is in the correct stoichiometric proportions to form zircon (zirconium silicate) the latter may be formed by heating the mixture beyond the decomposition temperature of the organic compound to the temperature at which the two oxides combine.

An obvious chemical equivalent way of obtaining the same result would be to mix a heat hardenable organic zirconium compound, such as a partially hydrolised zirconium ester with silica, or with a heat hardenable silicon compound, and heating the mixture. There are, however, difficulties in producing such equivalent zirconium compounds and in any case the easier commercial way is to use the organic silicon compounds in admixture with zirconia.

Further investigation has shown that the reaction depends upon obtaining one of the reactants, more particularly the silica, in the ultra finely divided state which is obtained when an organic compound thereof is decomposed. Consequently, if silica obtained by decomposition of an organic compound thereof or by combustion of an organic compound mixed with the vapour of a silicon compound, be mixed with zirconia and heated to the temperature at which the two oxides combine, the mixture will be converted into zircon.

Broadly stated, the present invention comprises heating a mixture of zirconia with finely divided silica, to the temperature at which the two oxides will combine. The finely divided silica is obtained by decomposing under oxidising conditions either an organic compound containing a silicon compound capable of yielding silica on oxidation or an organic silicon compound.

The finely divided silica may be made up into the form of a dispersion of the free silica or a solution of a compound thereof and mixed with the zirconia and the mixture heated to free the finely divided silica for reaction with the zirconia. It is, however, an important feature of this invention that the silica be employed in the form of a heat hardenable organic silicon compound so that the mixture may be mixed with a refractory material and shaped prior to the conversion of the silicon compound into silica.

According to another feature of the invention mineral zircon may be used as aggregate in the production of, for example, a mould or core for metal casting or other shaped refractory, and for this purpose may be mixed with zirconia and a heat hardenable organic silicon compound and the mixture moulded to shape.

The binder may be caused to set by chemical means and if desired the whole mass may be then heated to convert the binder to the anhydrous oxide, and, if the liquid binder has been properly proportioned with relation to the oxide, on further heating to a higher temperature the silica and zirconia combine to form the highly refractory zirconium silicate, thus giving the refractory material a far higher melting point and greatly increased hardness.

The proportions of zirconia, zircon and silica used may be varied. As an example, without limiting the scope of the invention, the case may be taken where zircon and zirconia are bound by use of an organic silicon compound, where the ratio of silica to zirconia is such that on complete reaction all the silica and zirconia are converted to zircon. Thus, the final result after heat treatment in this case is a mass of hard, highly refractory zirconium silicate of the originally moulded size and shape, all the lower melting silica having been removed by reaction with zirconia. Other proportions of zirconia to silica and zircon to zirconia plus silica may be used in order to obtain specific properties as indicated by the melting point diagram for the mixture $SiO_2/ZrO_2$ and by the other physical properties of the resultant mixture.

The silica may be introduced as such by hydrolysing an organic compound thereof, such as, for example, an alkoxy or aryloxy silicane.

The following examples are given by way of illustrating convenient methods by which the invention may be carried into effect:

*Example 1*

A condensation product of partially hydrolyzed ethyl orthosilicate was prepared by submitting ethyl orthosilicate partially hydrolyzed with less than 1 mol of water per mol of silicon ester to refluxing under conditions such that free alcohol, orthosilicate and lower boiling fractions are able to distil over until they have been removed as observed by a change in the reflux temperature, namely as follows:

500 mls. of ethyl silicate prepared from silicon tetrachloride and industrial alcohol containing 5% of water were placed in a litre distillation flask fitted with a small reflux head adapted to prevent fractions distilling above 165° C. from coming over. The distillation is carried on until 300 mls. of distillate had been collected over a period of 30 hours heating. The residue remaining after the above 300 mls. of distillate had been collected was poured into an open dish and then heated with continuous stirring at 260° C. for 1 hour when a second product consisting of a rubber-like tacky resin was obtained.

211 mls. of this condensation product was dissolved in 186 mls. methylated spirit and 1 kgr. zirconia was then mixed in to form a paste. The ester:water ratio in the ethyl silicate solution was 100:5.3 and it contained slightly under 15.8% silica.

The above mixture was cast in a mould and the casting was air dried without cracking and was heated to 1,000° C. to convert the silica compound into silica and bring about combination with zirconia. For complete conversion a temperature up to 1,500° C. is desirable but when the article is to be used as a refractory it is not necessary to carry the conversion to completion.

*Example 2*

200 grams of zirconia was mixed with 70 mls. of the same ester condensation product as in Example 1, and 30 mls. of methylated spirit and the mixture worked up with 800 grams zircon sand and shaped into a mould from a pattern and air dried for eight hours.

The screen anaylsis of the zircon sand was as follows:

Passing 60 mesh and stopping at 80 mesh 2.4%
Passing 80 mesh and stopping at 100 mesh 33.0%
Passing 100 mesh and stopping at 120 mesh 40.4%
Passing 120 mesh and stopping at 150 mesh 23.2%

The present invention provides a refractory material which when heated to the reaction temperature produces zircon and thus may be used for a variety of purposes either by itself or admixed with zircon or other refractory material prior to heating for the production of a number of refractory articles such as furnace linings, crucibles, casting moulds, combustion tubing, which are required to stand high temperatures without softening or disintegrating.

We have found, however, that the final materials produced after heating to high temperatures may be useful for many purposes where resistance to high temperatures is not essential, in particular, to replace hard metals. Owing to the great hardness of the material and the accuracy of the dimensions obtained when a hardenable silicon compound is used as a binder for zircon particles it is possible to produce many articles which would otherwise have to be machined from hard metal. A moulding of this material may be given a high polish and may be hardened like any ordinary thermo-setting plastic and then converted without change of dimensions to a very hard material. Thus a mould for moulding plastics, for instance, may itself be produced by moulding and hardening and then converted to a very hard material with polished surface.

In carrying out the process of this invention for purposes where dimentional accuracy is important, it is highly desirable to use zirconia which has been calcined at a temperature up to 1,500° C. as otherwise during the final heat treatment of the moulded products there may be modifications in the zirconia as produced by some processes which would result in a certain amount of shrinkage.

What we claim is:

1. A process for the production of a refractory material which comprises reacting by heating a mixture of (a) zirconia with (b) finely-divided silica in substantially the stoichiometric proportions required for the formation of zircon, and (c) mineral zircon to a temperature above 1,000° C. but below that at which fusion of the mixture takes place and thereafter cooling the product, whereby zirconium silicate is formed in situ and is present in the composition in sufficient quantity to bind the particles of the mineral zircon.

2. A process for the production of a refractory article which comprises mixing into a paste zirconia with a solution of an organic silicon compound which will hydrolyze to provide silica, hydrolyzing said compound in situ, shaping and drying the mass, and finally heating to a temperature above 1000° C. but below that at which fusion of the mixture takes place and thereafter cooling the product, the proportion of the silicon compound being adjusted so that the silica content thereof in relation to the zirconia is substantially in the proportion required for the stoichiometric formation of zircon, thereby forming zirconium silicate in situ.

3. A process for the production of a refractory article which comprises mixing into a paste zirconia with a solution of an organic silicon compound which will oxidize to provide silica, shaping the mass and heating to decompose the organic silicon compound, and continuing the heating to a temperature above 1,000° C. but below that at which fusion of the mixture takes place and thereafter cooling the product, the proportion of the silicon compound being adjusted so that the silica content thereof in relation to the zirconia is substantially in the proportion required for the stoichiometric formation of zircon, thereby forming zirconium silicate in situ.

4. A process as claimed in claim 2, wherein powdered mineral zircon is incorporated into the mixture prior to shaping.

5. A process as claimed in claim 3, wherein powdered mineral zircon is incorporated into the mixture prior to shaping.

6. A process as in claim 2 in which the organic silicon compound is ethyl silicate.

CLIFFORD SHAW.
WILLIAM EDWIN SMITH.
DENIS ERIC BOSWORTH GREENSMITH.

REFERENCES CITED

The following references are of record in the file of this patent:

UNITED STATES PATENTS

| Number | Name | Date |
| --- | --- | --- |
| 1,673,106 | Donaldson et al. | June 12, 1928 |
| 1,923,003 | Morgan | Aug. 15, 1933 |
| 2,058,844 | Vaughn | Oct. 27, 1936 |
| 2,347,733 | Christensen | May 2, 1944 |
| 2,442,976 | Heany | June 12, 1948 |